United States Patent
Weischedel et al.

[15] 3,665,291
[45] May 23, 1972

[54] SELF-OSCILLATING CONSTANT FREQUENCY SWITCHING REGULATOR WITH PHASE CONTROL OF VOLTAGE REGULATION LOOP

[72] Inventors: Herbert Rudolf Weischedel, Rockaway; George Raymond Westerman, Denville, both of N.J.

[73] Assignee: Bell Telephone Laboratories, Incorporated, Murray Hill, N.J.

[22] Filed: Dec. 21, 1970

[21] Appl. No.: 100,233

[52] U.S. Cl. ................................323/17, 321/2, 323/22 T, 323/38, 323/DIG. 1
[51] Int. Cl. .................................................G05f 1/56
[58] Field of Search..................321/2; 323/17, 22 T, 22 SC, 323/38, DIG. 1

[56] References Cited

UNITED STATES PATENTS

| 3,378,758 | 4/1968 | Goodenow | 323/DIG. 1 |
| 3,527,999 | 9/1970 | Weinberger | 323/DIG. 1 |

FOREIGN PATENTS OR APPLICATIONS

| 1,438,211 | 1968 | Germany | 323/DIG. 1 |

*Primary Examiner*—Gerald Goldberg
*Attorney*—R. J. Guenther and E. W. Adams, Jr.

[57] ABSTRACT

A self-oscillating switching mode regulator is frequency regulated by controlling the phase of the voltage control feedback signal. The phase lag of the feedback signal is controlled by a frequency regulation control loop. By continuously adjusting the phase lag of the feedback signal, the frequency of switching is maintained at a regulated value.

6 Claims, 3 Drawing Figures

Patented May 23, 1972

INVENTORS H. R. WEISCHEDEL
G. R. WESTERMAN
BY Alfred T. Steinmetz
ATTORNEY

SELF-OSCILLATING CONSTANT FREQUENCY SWITCHING REGULATOR WITH PHASE CONTROL OF VOLTAGE REGULATION LOOP

BACKGROUND OF THE INVENTION

This invention relates to switching mode voltage regulators. It is specifically concerned with the self-oscillating type switching regulator and relates more particularly to the regulation of the frequency of operation of the switching regulator.

Switching mode regulators operate by transmitting pulses of energy from a source of continuous energy to an output terminal via a switching device. The voltage level appearing at the output terminal is regulated by comparing it to a reference signal. An error signal is generated by this comparison and utilized to control the switching device transmitting the pulses of energy.

Switching mode regulators may be driven or self oscillating. The driven switching regulator transmits the pulses of energy at a fixed frequency. This fixed frequency is controlled by a discrete frequency source. The driven switching regulator switches at a constant frequency, but its response to changes in the output voltage level may be delayed since there is a loss of regulation control during a portion of each switching cycle.

The self-oscillating or free running switching mode regulator inherently counteracts excursions of the output voltage beyond specified levels. An advantage of the self-oscillating switching regulator is its circuit simplicity as compared with the driven switching regulator. A typical self-oscillating switching mode voltage regulator shown in FIG. 1 has a series switching transistor 110 inserted between an input terminal 101, to which power is applied, and an output terminal 103, to which a load is connected. The series switching transistor 110 is controlled so that it transmits energy whenever the voltage at terminal 103 drops below a specified level. The transmission of energy through the transistor 110 is inhibited when the voltage at the output terminal 103 rises above another specified level.

The control circuitry utilized to control the switching of the switching transistor 110 includes a potentiometer 108 shunted across the output terminals 103 and 104. A voltage proportional to the voltage across the output terminals 103 and 104 is transmitted from the wiper arm of the potentiometer 108 to a voltage error detector circuit 109. The voltage error detector circuit 109 comprises a source of reference voltage and a comparison circuit which generates a signal proportional to the difference between the reference voltage and the voltage at the wiper arm of the potentiometer 108. The signal output of the voltage error detector 109 is applied to an amplifier 115 and from thence to the base 111 of the switching transistor 110. This error signal determines the conductive state of the switching transistor 110.

In operation the output voltage of the regulator increases until the error voltage output of detector 109 is sufficient to bias the switching transistor 110 non-conducting.

During the nonconducting period of transistor 110 the load current is supplied, via the flyback diode 105, the inductor 106 and capacitor 107, to the output load. As the current in inductor 106 decays and capacitor 107 discharges, the voltage across the output terminals 103 and 104 begins to decrease. As the output voltage decreases, the error signal output of the voltage error detector 109 changes and when it crosses a specified threshold the switching transistor 110 is biased into conduction again. While this regulator circuit arrangement is fairly simple and reliable, its frequency of operation is not constant. For example, the switching frequency responds to changes in the input source voltage coupled to terminals 101 and 102 and to changes in the output load impedance coupled to output terminals 103 and 104. In addition, the frequency of operation may be responsive to entrainment of the switching frequency to some outside frequency source coupled to the regulator or by periodic signals which may be reflected from the output load connected to output terminals 103 and 104.

It is therefore an object of the invention to regulate the frequency of a self-oscillating switching regulator.

It is another object of the invention to control the phase angle of the voltage control feedback signal in a switching regulator in response to variations in the switching frequency.

SUMMARY OF THE INVENTION

The above objects are achieved by controlling the reactance of the voltage control feedback circuit of a switching regulator in response to its switching frequency. By varying the reactance of the feedback circuit, the phase angle of the voltage control feedback signal is altered thereby controllably altering the switching frequency of the regulator. The phase angle of the feedback signal is controllably varied in response to a frequency-to-voltage converter whose voltage output is utilized to vary the reactance of the feedback circuit.

BRIEF DESCRIPTION OF THE DRAWINGS

A more comprehensive understanding of the invention may be acquired by reference to the following detailed description and drawings of illustrative embodiments of the invention, wherein.

DETAILED DESCRIPTION

Figure 1:
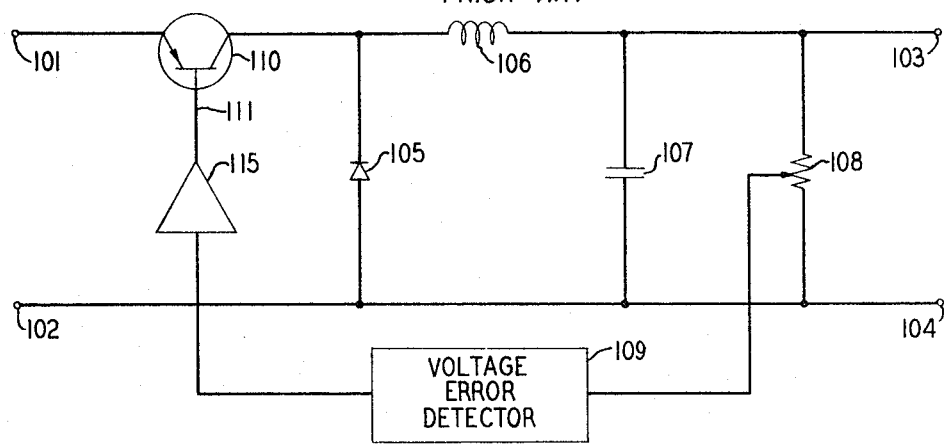
FIG. 1 is a diagram of a typical switching mode regulator existing in the prior art which is described hereinabove.
Figure 2:
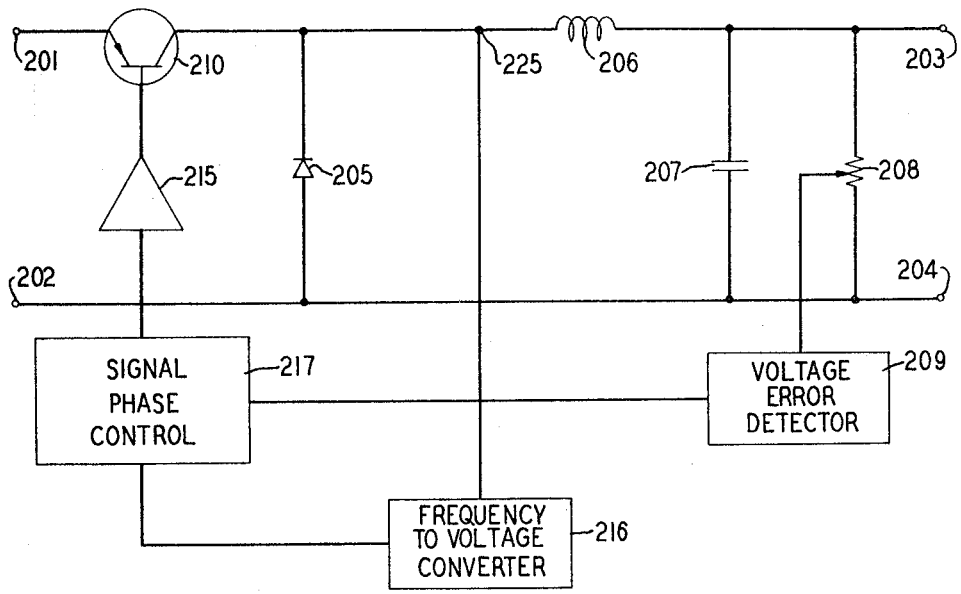
FIG. 2 is a diagram of a switching mode regulator which is frequency regulated according to the principles of the invention.

The switching regulator, disclosed in FIG. 2, operates in substantially the same manner as does the switching regulator described above and disclosed in FIG. 1. Energy from an input voltage source coupled to the input terminals 201 and 202 is intermittently transmitted by the switching transistor 210 to a load connected to the output terminals 203 and 204. The conduction periods of the switching transistor 210 are controlled in response to the voltage error detector 209. The voltage error detector 209 monitors the output voltage, via the potentiometer 208, and applies appropriate switching signals, via the signal phase control 217 and amplifier 215, to the switching transistor 210. During the nonconductive periods of the transistor 210, energy is supplied to the load via the flyback diode 205, the inductor 206, and the capacitor 207.

The frequency at which the switching transistor 210 switches is responsive to changes in the input voltage and the output load. The changes which may occur in these parameters alter the load current flowing through the switching transistor 210 and, in at least one aspect, alter the storage time of transistor 210 hence changing its switching frequency. Other factors which may adversely affect the switching frequency of transistor 210 include outside signal sources and periodic signal reflections at the output terminals 203 and 204.

The switching regulator includes a frequency-to-voltage converter 216 which is coupled to node 225 in order to monitor the switching frequency of the switching transistor 210. The converter 216 generates a voltage directly proportional to this switching frequency and compares it to a reference voltage generated internally by the switching regulator. The converter 216 derives a frequency error signal from this comparison and applies this error signal to the signal phase control 217 in the voltage feedback circuit.

The signal phase control 217 controls the relative phase of the voltage feedback signal in the voltage feedback circuit. The control of the phase of the feedback signal directly compensates for variations in the storage time of the switching transistor due to changes in the load current. For example, if the load current traversing transistor 210 decreases, the switching frequency increases. In response to this increase, the frequency-to-voltage converter generates a frequency error signal which, applied to the signal phase control 217, retards the phase of the feedback signal in the voltage feedback circuit. This phase retardation reduces the natural frequency of the voltage feedback circuit and reduces the switching frequency of the switching transistor 210 to its regulated value. The converse frequency regulation occurs if the load current increases.

Figure 3:
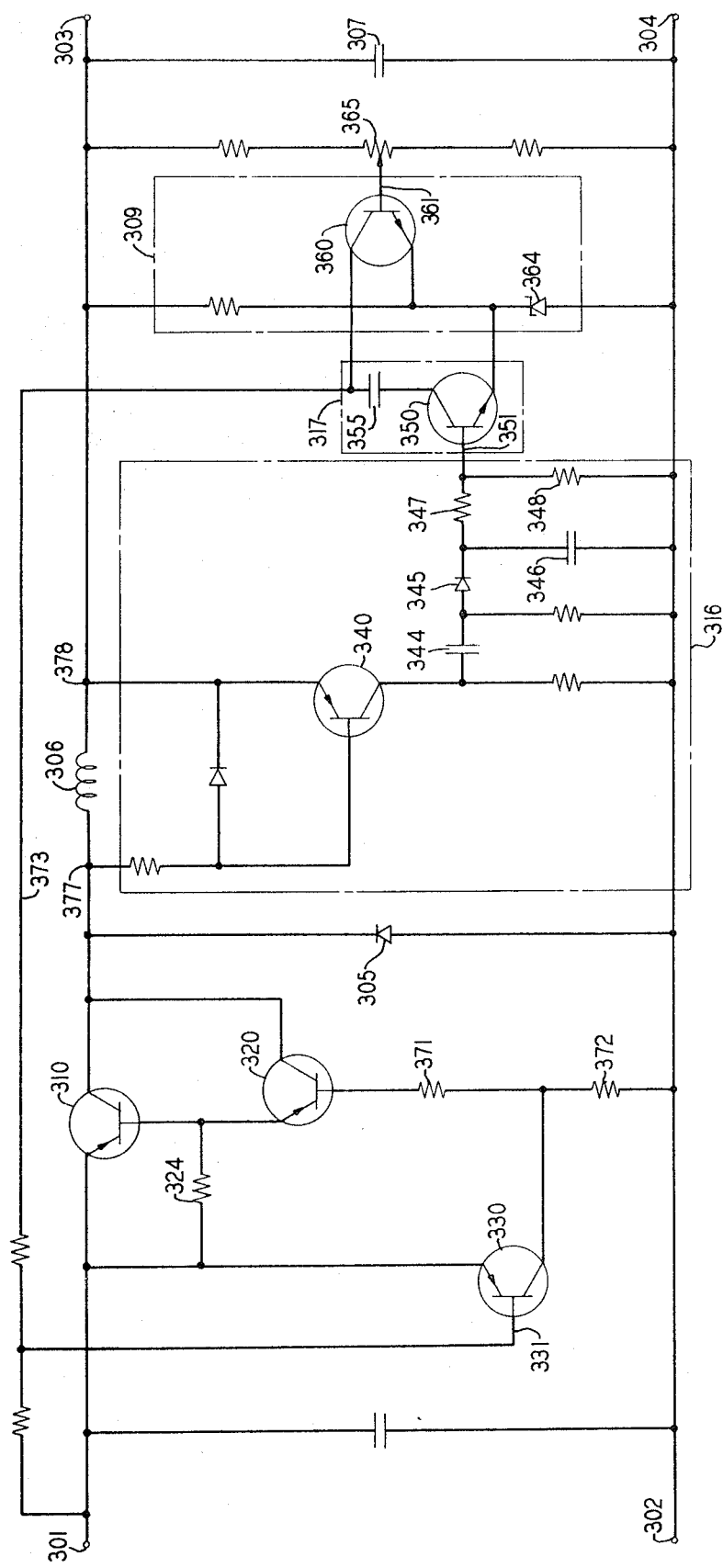
FIG. 3 is a schematic diagram of a switching regulator with a frequency regulation feedback arrangement according to the principles of the invention.

The voltage regulator schematic disclosed in FIG. 3 embodies the principles and the features of the switching regulator shown in block diagram form in FIG. 2. A positive source whose voltage is to be regulated may be coupled to the input terminals 301 and 302. The load to which the regulated voltage is to be applied may be coupled to the output terminals 303 and 304. When the input voltage is initially applied to input terminals 301 and 302, the current through the base emitter junctions of the transistors 310 and 320 and the biasing resistors 371 and 372 is sufficient to drive these two compound connected transistors into saturation.

With transistors 310 and 320 conducting, a load current flows from the input terminal 301 through the collector-emitter path of transistor 310 and the inductor 306 to the output terminal 303. This current energizes a load coupled across the output terminals 303 and 304 and causes a voltage drop thereacross. This output voltage is monitored by the voltage error detector circuit 309. The error detector 309 is connected to a potentiometer 365 which is shunted across the output terminals 303 and 304. This error detector circuit 309 comprises a transistor 360 whose base electrode 361 is connected to the wiper arm of the potentiometer 365. The voltage reference breakdown diode 364 establishes the emitter voltage of the transistor 360. Hence the conductivity of transistor 360 is directly proportional to deviations of the output voltage of the regulator from its regulated value.

After conduction has been initiated in the transistor 310, the output voltage increases in magnitude. The increase in this voltage is detected at the base electrode 361 of transistor 360, which is connected to the potentiometer 365. The transistor 360 amplifies this voltage increase and applies it, via the voltage feedback lead 373, to the base electrode 331 of the transistor 330. The collector-emitter path of transistor 330 shunts the emitter base paths of transistors 310 and 320.

As the output voltage increases in magnitude, the increased voltage applied, via the potentiometer 365, to the base 361 of transistor 360 biases it into a more highly conductive condition. As transistor 360 becomes more conductive, its collector voltage decreases in value. As the collector voltage drops, it passes a threshold at which the transistor 330 is biased into a conducting condition. With transistor 330 conducting the emitter-base current which normally traverses transistors 310 and 320 is diverted through the conductive path of transistor 330. Since the bias currents are removed from transistors 310 and 320, these transistors turn off and no longer conduct current from input terminal 301 to the output terminal 303. The output load current is now supplied, via the flyback diode 305 due to the energy stored in the inductor 306 and capacitor 307.

The load current furnished by the stored energy in the inductor 306 and the capacitor 307 begins to decay and the voltage drop across the load connected across terminals 303 and 304 decreases in magnitude. As the voltage decreases, the voltage applied to the base electrode 361 of the detector 309 decreases in magnitude, reducing the conductivity of transistor 360. The collector voltage of transistor 360 consequently increases. This increased collector voltage is applied, via the feedback lead 373, to the base 331 and biases the transistor 330 into a nonconducting condition. With transistor 330 nonconducting, the base current through the base-emitter junction of transistor 310 and transistor 320 is sufficient to again initiate conduction in these transistors. The transistors 310 and 320 become saturated in the same manner as described above and the regulation cycle repeats itself.

As described above, the switching frequency of the regulator may vary in response to a change in any one of many parameters. Variables which induce frequency changes may involve changes in the input voltage, variations in the output load and changes in the load current. The switching frequency of the regulator is continuously monitored by the frequency-to-voltage converter 316. The frequency-to-voltage converter 316 has two terminals 377 and 378 which are connected across the inductor 306. Each time the switching transistor 310 is biased into a nonconducting condition, a reverse voltage is induced in the inductor 306. This reverse voltage biases the transistor 340 into a conducting condition. The conducting transistor 340 transmits the regulated voltage appearing at the output terminal 303, via the capacitor 344 and the diode 345, to the integrating capacitor 346. The two capacitors 344 and 346 in combination with the diode 345 comprise a pulse counter circuit which counts the voltage reversals of the inductor 306. These voltage reversals are directly proportional to the switching frequency of the regulator. The charge on capacitor 346 discharges via the resistors 347 and 348 to ground. The frequency at which the transistor 340 is biased into conduction determines the average voltage across the capacitor 346.

The voltage feedback loop includes a signal phase control circuit 317 which comprises a series connected combination of a transistor 350 and capacitor 355. This series combination is shunted across the collector-emitter junction of the transistor 360. The voltage across the capacitor 346 is connected, via the voltage divider comprising the resistors 347 and 348, to the base electrode 351 of transistor 350. The emitter voltage of transistor 350 is the reference voltage established by the breakdown diode 364. Hence the impedance of the transistor 350 is directly responsive to the deviation of the switching frequency from the regulated frequency. The value of the regulated frequency is determined by the magnitude of the reference voltage.

It is readily apparent from the foregoing that as the impedance of transistor 350 is adjusted, the relative effect of the capacitance of capacitor 355 on the voltage control feedback circuit is changed with respect to frequency. If, for example, the frequency of the regulator increases, the frequency at which the transistor 340 is biased into conduction increases. Hence in a given period of time, the number of pulses counted by and stored on the capacitor 346 is increased, increasing the average voltage level thereon. This increased voltage level on the capacitor 346 biases the transistor 350 into a more highly conductive condition and hence increases its conductivity. Hence the relative capacitance value respective to the total impedance of the parallel impedance, including transistors 350 and 360, increases. This added capacitance introduces an added phase lag into the voltage feedback signal applied, via lead 373, to the base 331 of the transistor 330. This increased phase lag reduces the switching frequency of the regulator to its regulated value. A corresponding decrease in the phase lag occurs if the switching frequency decreases. This decrease in the phase lag acts to increase the switching frequency to its regulated value.

It is apparent that the circuit can be modified to provide an independent reference voltage to permit frequency adjustment. Many other modifications will be apparent to those skilled in the art within the scope of the invention.

What is claimed is:
1. A self-oscillating switching regulator to derive a regulated voltage from an unregulated voltage source comprising
an input and an output,
a switching device coupling said input and output,
a voltage regulation feedback circuit to control said switching device including an amplifier device responsive to the voltage at said output, said voltage regulation circuit further including means to control the phase of signals in the voltage regulation circuit,
a frequency-to-voltage converter responsive to the switching frequency of said switching device,
said means to control the phase of signals including means to vary the reactance of said voltage feedback circuit comprising a reactive device and a variable impedance device connected in series, said series connection shunting said amplifier device, and said variable impedance device coupled to and responsive to said frequency-to-voltage converter.

2. A self-oscillating switching regulator as defined in claim 1 wherein said variable impedance device comprises
   a second amplifier device connected in series with said reactive device, and
   the conductivity of said second amplifier device being responsive to said frequency-to-voltage converter.

3. A self-oscillating switching regulator as defined in claim 2 wherein said frequency-to-voltage converter comprises
   a pulse differentiation circuit and a diode pulse counter including a count storage capacitor with a discharge path to drain said storage capacitor, and
   said voltage across said storage capacitor being coupled to said second amplifier device.

4. A self-oscillating switching regulator to supply a regulated output voltage from an unregulated voltage source comprising
   input and output terminals,
   a switching device interconnecting said input and output terminals and including a control electrode to control switching therein,
   a voltage regulating feedback circuit including the conducting path of an amplifying device having an input electrode coupled to and responsive to the voltage at said output terminal and coupled to said control electrode,
   a frequency-to-voltage converter responsive to the frequency of switching of said switching device,
   a signal phase control circuit in said feedback circuit including an energy storage device and an electronically controllable impedance responsive to said converter connected in series, said series connection shunting said amplifying device whereby the impedance and energy storage characteristics of said phase control circuit are altered in response to variations in the frequency of switching of said switching device to compensate for these frequency variations.

5. A self-oscillating switching regulator as defined in claim 4 wherein
   the conducting path of said amplifying device included in said voltage regulating feedback circuit comprises the collector-emitter path of a first transistor,
   said phase control circuit comprises a second transistor and a capacitor connected in series with the collector-emitter path of said second transistor, and
   said phase control circuit and said first transistor being connected in parallel.

6. A self-oscillating switching regulator as defined in claim 5 wherein
   said frequency-to-voltage converter includes means to integrate the output of said switching regulator, and
   means to utilize said integrated output to control said phase control circuit including a source of reference voltage.

* * * * *